United States Patent [19]

Yue et al.

[11] Patent Number: 5,410,030
[45] Date of Patent: Apr. 25, 1995

[54] DIMERS OF UNSYMMETRICAL CYANINE DYES CONTAINING PYRIDINIUM MOIETIES

[75] Inventors: Stephen T. Yue; Richard P. Haugland, both of Eugene, Oreg.

[73] Assignee: Molecular Probes, Inc., Eugene, Oreg.

[21] Appl. No.: 43,665

[22] Filed: Apr. 5, 1993

[51] Int. Cl.$^6$ .................... C07H 21/02; C07H 21/04
[52] U.S. Cl. ................... 536/23.1; 536/24.3; 536/25.32; 546/165; 546/256; 546/152; 546/176
[58] Field of Search ............... 546/165, 256, 152, 176; 536/23.1, 24.3, 25.32

[56] References Cited

U.S. PATENT DOCUMENTS

| | | | |
|---|---|---|---|
| 2,269,234 | 1/1942 | Sprague | 436/63 |
| 4,883,867 | 11/1989 | Lee et al. | 548/146 |
| 4,957,870 | 9/1990 | Lee et al. | 436/63 |

OTHER PUBLICATIONS

Brooker, et al., J. Am. Chem. Soc. 64, 199 (1942).
Lee, et al., *Thiazole Orange: A New Dye for Reticulocyte Analysis,* Cytometry 7, 508 (1986).
Rye, et al., Nucleic Acids Research, 19(2), 327 (1990).
Haugland, Molecular Probes Handbook of Fluorescent Probes and Research Chemicals Set 31 (1992).
Rye, et al., Nucleic Acids Research, 20, 2803 (1992).
Johnson, et al., *Asymmetric Cyanine Dyes for Fluorescent Staining and Quantification of Nucleic Acids,* Biophys. J., 61, A314 (1992).
Teale, et al., Trans. Faraday Soc., 53, 646 (1957).
Griffiths, Colour and Constitution of Organic Molecules, p. 241 Academic Press (1976).
Houben–Weyl Methoden Der Organischen Chemie, Band V/1d, pp. 231–299 (1972).
Nucleic Acid Hybridization: A Practical Approach, B. D. Hames and S. J. Higgens, eds., IRL Press, Washington, D.C., 1985.

*Primary Examiner*—C. Warren Ivy
*Assistant Examiner*—Zinna N. Davis
*Attorney, Agent, or Firm*—Allegra J. Helfenstein; Anton E. Skaugset

[57] ABSTRACT

The invention relates to nucleic acid stains that are homo- or heterodimers of unsymmetrical cyanine dyes, where at least one dye unit of the dimer is a substituted or unsubstituted benzazolium- or naphthazolium-pyridinium derivative, which dye unit is linked to another unsymmetrical cyanine dye unit, that is the same or different by an aliphatic chain containing one or more heteroatoms; such that the fluorescence of the dye molecules, when bound to nucleic acids, is enhanced. These dimers of unsymmetrical cyanine dyes have spectral properties and binding affinities superior to related monomers. In addition, the dyes can be tailored to absorb and emit in a wide range of wavelengths, which can be further varied by energy transfer mixtures, making the dyes useful for applications that involve simultaneous use of multiple dyes.

30 Claims, 9 Drawing Sheets

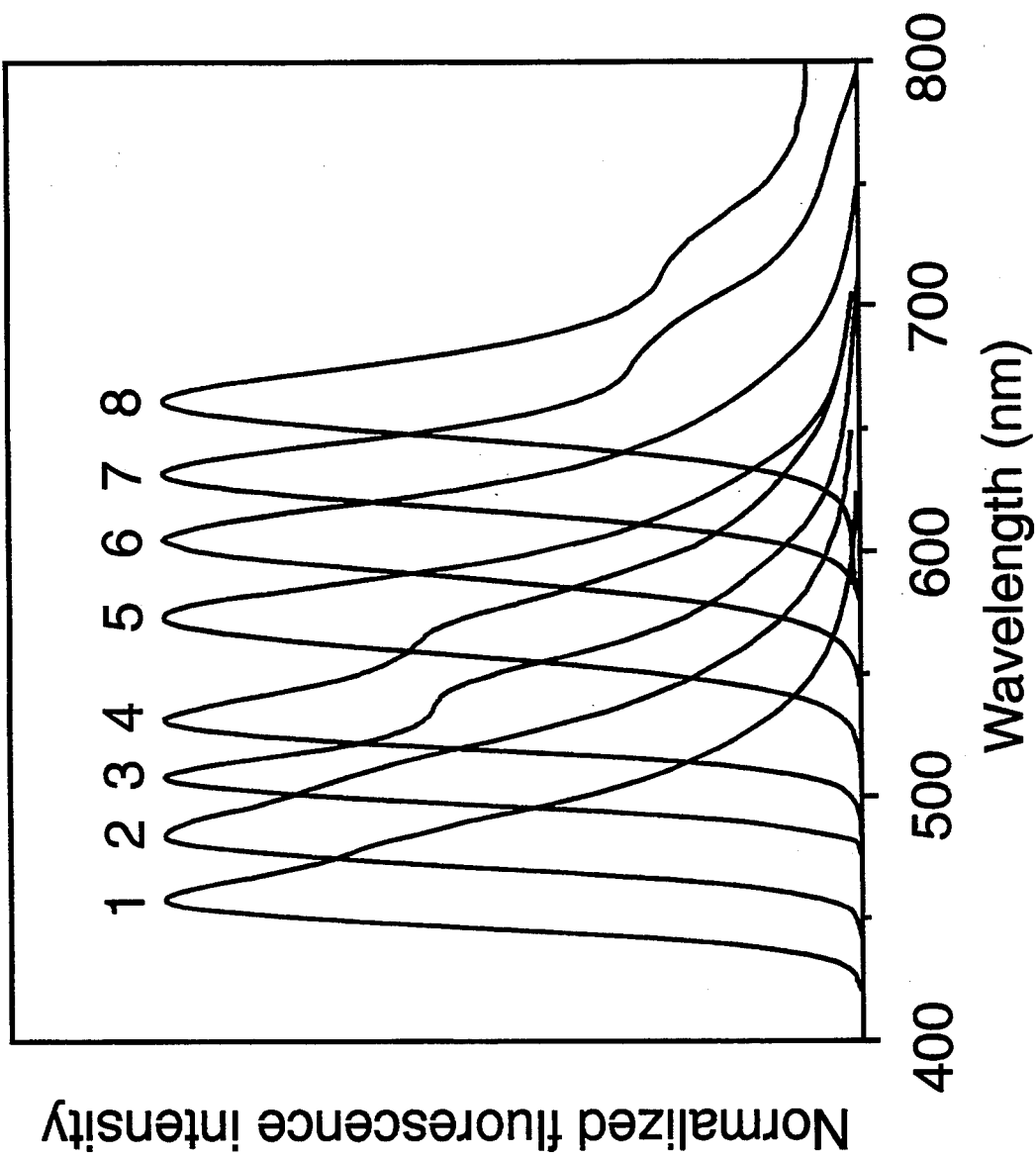

DIMERS OF UNSYMMETRICAL CYANINE DYES CONTAINING PYRIDINIUM MOIETIES

FIELD OF THE INVENTION

The invention relates to novel fluorescent dyes. In particular, the invention relates to nucleic acid stains that are dimers of unsymmetrical cyanine dyes where at least one of the dye units of the dimer contains a pyridinium moiety.

BACKGROUND OF THE INVENTION

Fluorescent dyes have many uses and are known to be particularly suitable for biological applications in which the high detectability of fluorescence is desirable. By binding to a specific biological ingredient in a sample, a fluorescent dye can be used to indicate the presence or the quantity of the specific ingredient in a sample. A variety of fluorescent dyes are available for specific fluorescent staining and quantitation of DNA and RNA, and other applications involving nucleic acids.

Unsymmetrical cyanine dyes were described long before much was known about DNA, by Brooker, et al., J. AM. CHEM. SOC. 64, 199 (1942). These dyes have since been found to be useful in fluorescent staining of DNA and RNA. The nondimeric unsymmetric cyanine dye sold under the tradename Thiazole Orange has particular advantages in the quantitative analysis of immature blood cells or reticulocytes (U.S. Pat. No.. 4,883,867 to Lee, et al. (1989) ('867 patent) and U.S. Pat. No. 4,957,870 to Lee, et al. (1990) ('870 patent); Lee, et al., *Thiazole Orange: A New Dye for Reticulocyte Analysis*, CYTOMETRY 7, 508 (1986)]. As indicated in the '867 and '870 patents to Lee, et al., the dye used for reticulocyte analysis must be able to penetrate the cell membrane.

The inventors have discovered that a composition that includes two suitably connected unsymmetrical cyanine dye units, i.e. a covalently bonded cyanine dye dimer in which one of the dye units contains a quaternized pyridinium moiety, is a polar compound that is unable to readily penetrate cell membranes. Nevertheless, the composition discovered by inventors is highly useful as a stain for nucleic acids because it is sensitive to even small fragments of nucleic acid polymers not contained inside living cells, e.g. in cell extracts, as well as to nucleic acids in permeabilized and/or dead cells. In addition, the novel dimers have a much higher affinity for nucleic acid than do compounds such as thiazole orange that are not dimers, lower fluorescence background for the unbound probe than known dimeric nuclear stains such as ethidium homodimer, spectra that can be distinguished from those of most other nuclear stains and good fluorescence quantum yields. These dimers are neither anticipated nor obvious in view of the unsymmetrical cyanine Thiazole Orange or related cyanine compounds containing pyridinium moieties described in the '867 patent or by Lee. et al., (1986) that are monomers.

Copending application DIMERS OF UNSYMMETRICAL CYANINE DYES (Ser. No. 07/761,177 filed 9/16/91) now abandoned, published on Apr. 1, 1993 as Int. Publ. No. WO 93106482, incorporated herein by reference, describes dimeric cyanine dyes in which one resonance structure of the unsymmetrical cyanine is quinolinium rather than pyridinium. The spectral properties of pyridinium derivatives are shifted to shorter wavelengths than those of the comparable dimers of quinolinium derivatives described in the co-pending application. Although the dimers containing pyridinium moieties also have a lesser binding affinity than the comparable quinolinium derivatives, the binding affinity of the pyridinium derivatives is considerably increased over related monomer dyes. In addition, the pyridinium derivatives unexpectedly have a faster rate of binding than the quinolinium derivatives.

Other dimer compounds that are known to bind to nucleic acids include variants of ethidium homodimer, acridine homodimers, acridine-ethidium heterodimer, and 7-hydropyridocarbazoles, see, e.g., Rye, et al., NUCLEIC ACIDS RESEARCH 19(2), 327 (1990); Haugland, MOLECULAR PROBES HANDBOOK OF FLUORESCENT PROBES AND RESEARCH CHEMICALS Set 31 (1992) (incorporated by reference). Although the Rye, et al. reference mentions characteristics that influence the affinity and mode of binding dimers to DNA, the reference does not describe or anticipate the advantages of the compounds used in this invention. In particular the 1990 Rye reference does not identify the unanticipated advantage of some of the subject dyes of being bound to nucleic acids with sufficiently high affinity that they co-electrophorese with the nucleic acid and undergo only minimal transfer between different nucleic acid helices as described by Rye, et al., NUCLEIC ACIDS RES. 20, 2803 (1992). Although the binding affinity as well as the fluorescent enhancement of the pyridinium derivatives are generally less than those of the comparable quinolinium derivatives, the pyridinium derivatives have nevertheless also been found to be useful for pre-staining of electrophoretic gels and have the unexpected advantage of faster uptake of dyes.

Other unsymmetrical cyanine dye compounds with increased binding affinity that are impermeant to cells are described in co-pending U.S. patent application Ser. No. 07/833,006 now U.S. Pat. No. 5,321,130 of the same inventors. These UNSYMMETRICAL CYANINE DYES WITH CATIONIC SIDE CHAIN are also described in part in *Asymmetric Cyanine Dyes for Fluorescent Staining and Quantification of Nucleic Acids*, presented at the 1992 Biophysical Society/ASBMB joint meeting and abstracted at BIOPHYS. J. 61, A314 (1992). While the cationic side chain increases the binding affinity of the monomer dyes, the binding affinity is generally orders of magnitude lower than that of the related dimers.

The novel cyanine dimers described herein are not only different in structure from other dimer compounds, but differ in spectral properties, binding affinities, and binding kinetics as well. There is a need for a full spectrum of nucleic acid dyes to take advantage of different laser instrumentation and for use in multi-color applications. Furthermore, there is a need for shorter wavelength dyes for nucleic acids that have greater detectability than existing dyes.

A representative homodimer is synthesized according to the procedure described in Examples 1 and 3. For example, where X is S, the compound is a dimer of a benzothiazolium derivative; where X is O, the compound is a dimer of a benzoxazolium derivative.

Figure 2:
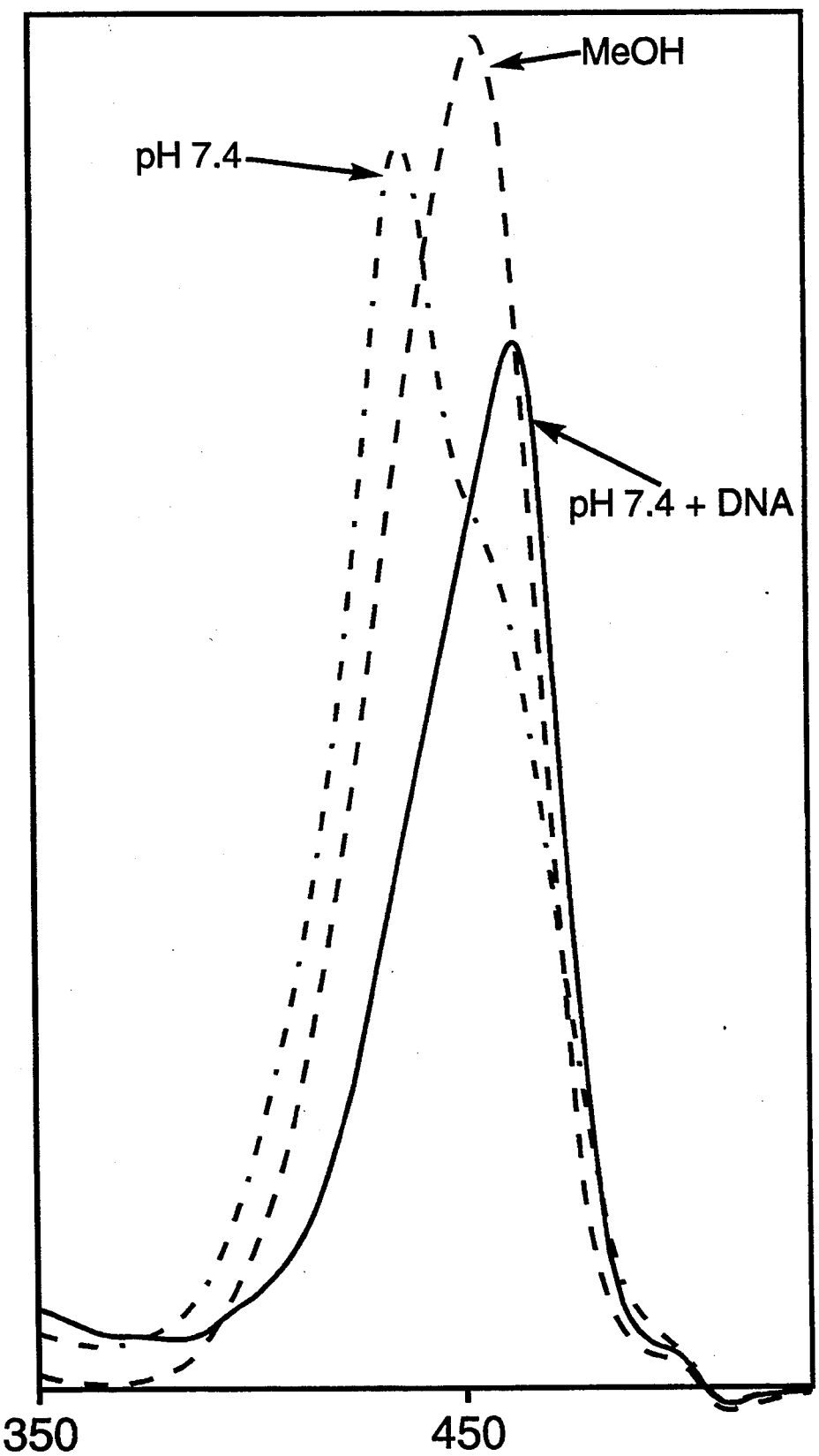

FIG. 2 Absorption Spectra of Representative Compound (BOBO-1)

Comparison of absorption spectra of three samples containing equal concentrations (1.7 μM) of BOBO-1. Solvents are methanol ("MeOH"), 10 mM TRIS, 50 mM NaCl, 1 mM EDTA, pH 7.4 ("pH 7.4 buffer") and pH 7.4 buffer with the addition of 200 μM (base pairs) calf thymus DNA, equilibrated for 90 minutes ("pH 7.4+DNA"). Spectra were recorded on an IBM Instruments 9420 spectrophotometer.

FIG. 3 Fluorescence Spectra of Representative Compounds

Normalized fluorescence emission spectra of four unsymmetric cyanine dyes containing a pyridinium moiety and four unsymmetric cyanine dyes containing a quinolinium moiety bound to calf thymus DNA. The pyridinium dyes are 1. POPO-1, 2. BOBO-1, 5. POPO-3 and 6. BOBO-3. The quinolinium dyes are 3. YOYO-1,4. TOTO-1, 7. YOYO-3 and 8. TOTO-3 (POPO, BOBO, TOTO, and YOYO are trademarks of Molecular Probes, Inc., Eugene, OR, and are used for compounds as described in Examples 1–6).

Fluorescence emission spectra were recorded on an SLM-500C spectrofluorometer using solutions comprising 0.4 μM dye in 10 mM TRIS, 50 mM NaCl, 1 mM EDTA, pH 7.4 with the addition of 20 μM (base pairs) calf thymus DNA, equilibrated for 90 minutes. Spectra were numerically rescaled to the same intensity value at the florescence emission maximum and overlayed for comparison.

Figure 4A:
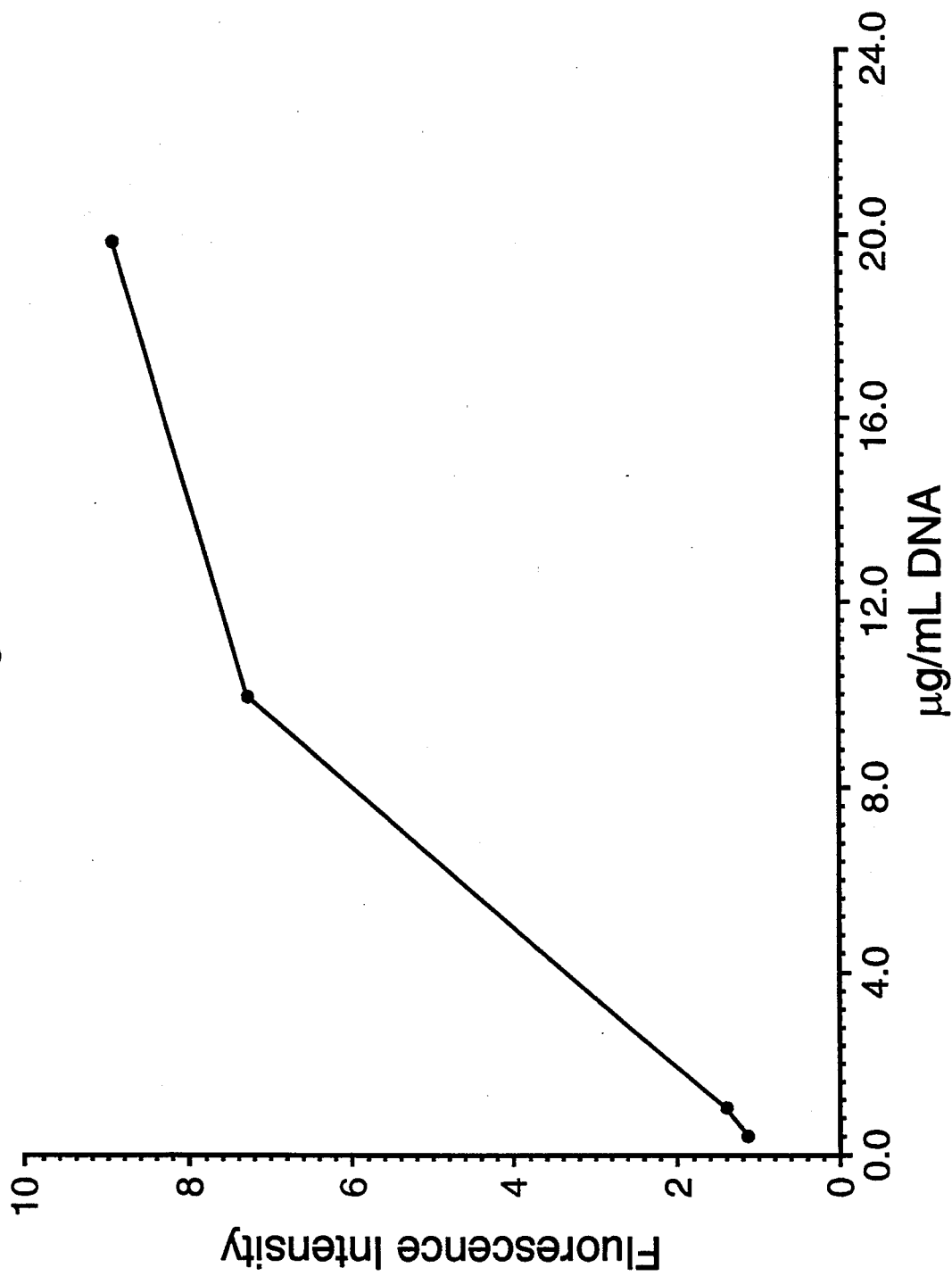
Figure 4B:
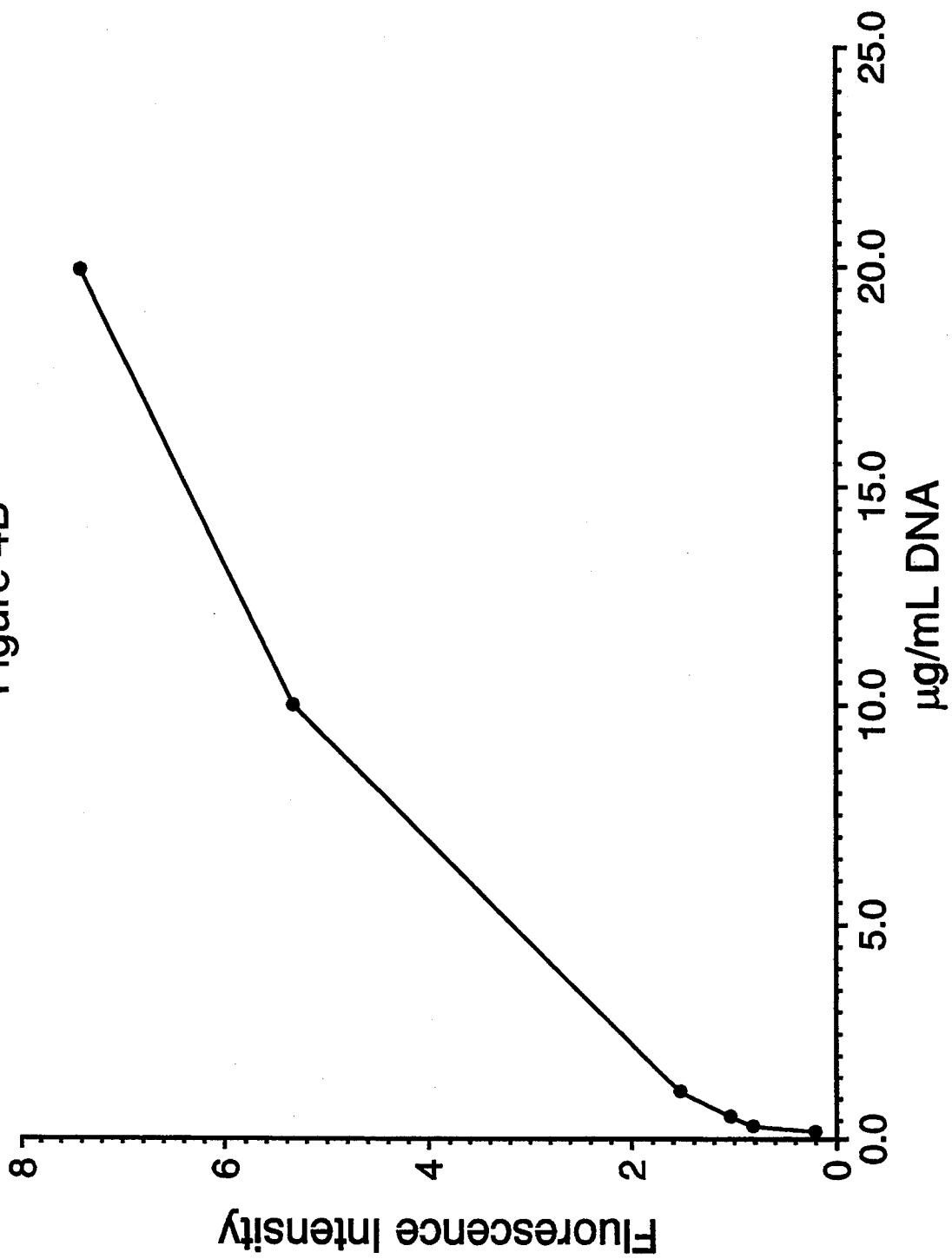

FIG. 4. Titration of DNA in T.E. using the procedure of Example 13.

A. DNA titrations of a representative benzothiazole derivative dimer (Compound 1/BOBO-1 ).

B. DNA titrations of a representative benzoxazole derivative dimer (Compound 3/POPO- 1 ).

Figure 5:
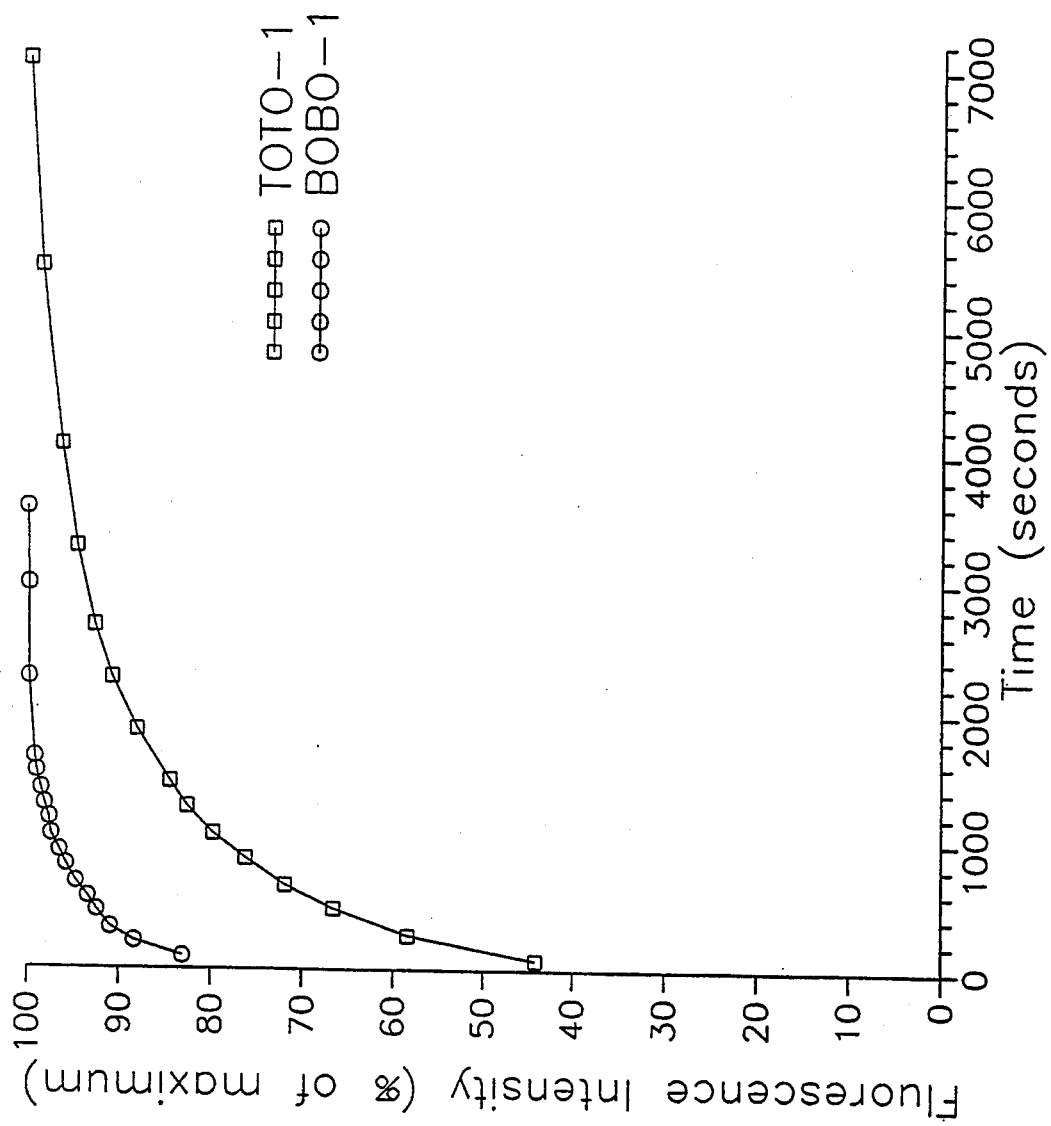

FIG. 5. Comparison of Binding Kinetics of Pyridinium versus Quinolinium Dimers.

Solutions of 0.4 μM dye in 10 mM TRIS, 50 mM NaCl, 1 mM EDTA, pH 7.4 were prepared and transferred to polystyrene cuvettes. The experiment was initiated by addition of calf thymus DNA to a final concentration of 20 μM (base pairs). The mixed sample was magnetically stirred throughout the experiment. Fluorescence was measured as a function of time using excitation/emission wavelengths of 496 nm/ 530 nm (for TOTO-1) and 450 nm/480 nm (for BOBO-1 ). The resulting data were rescaled to represent the percentage fluorescence intensity relative to the maximal value obtained at the end of the experimental time course.

Figure 6:
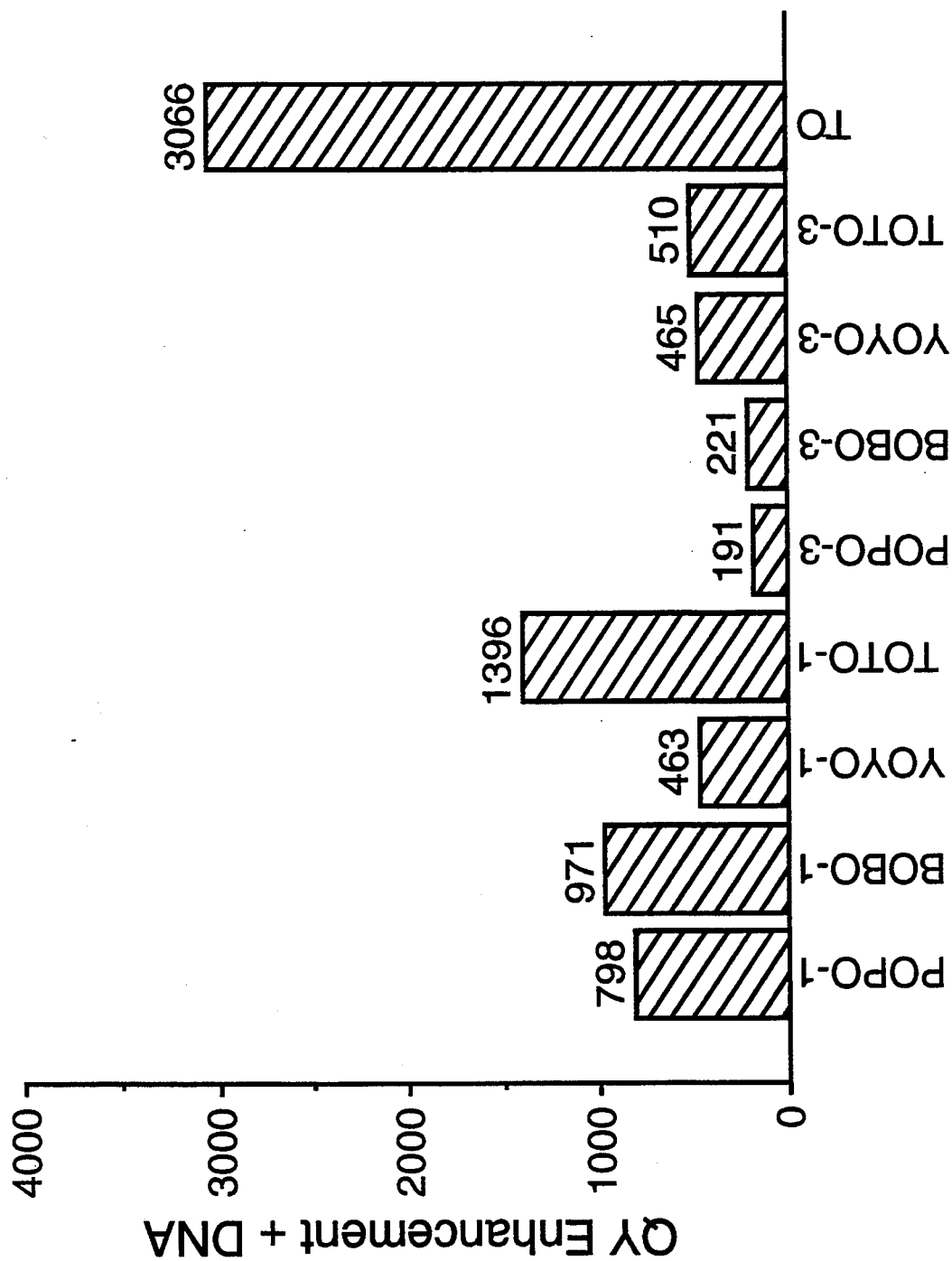

FIG. 6. Comparison of Fluorescent Enhancement for Pyridinium and Quinolinium Dimers.

The fluorescence enhancement on DNA binding (defined as the ratio of the fluorescence quantum yield for the DNA complex to that of aqueous free dye) was determined by measuring and integrating the respective fluorescence emission spectra with excitation at the isosbestic point between the corresponding absorption spectra. Careful subtraction of background signals measured using a dye-free blank was necessary for accurate quantitation of the very weak emission of the free dye. Samples contained 0.4 μM dye in 10 mM TRIS, 50mM NaCl, 1 mM EDTA, pH 7.4 ("free dye") and free dye with addition of 20 μM (base pairs) calf thymus DNA, equilibrated for 90 minutes ("DNA complex").

Figure 7:
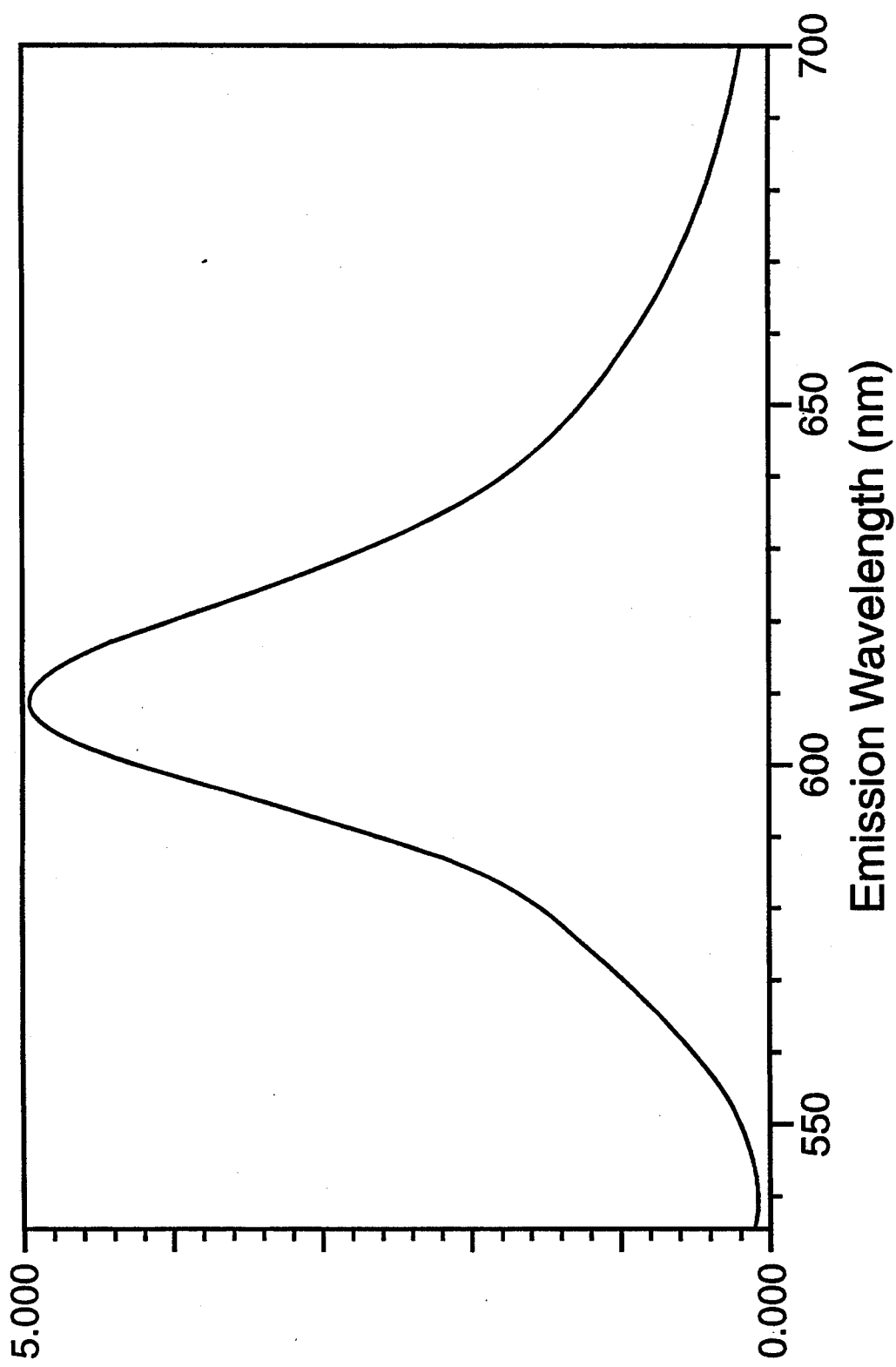

FIG. 7. Emission Spectrum of Energy Transfer Mixture

An equimolar mixture of POPO-3 and BOBO-3 (0.4 μM each) with 8 μM base pairs DNA excited at 530 nm.

Figure 8:
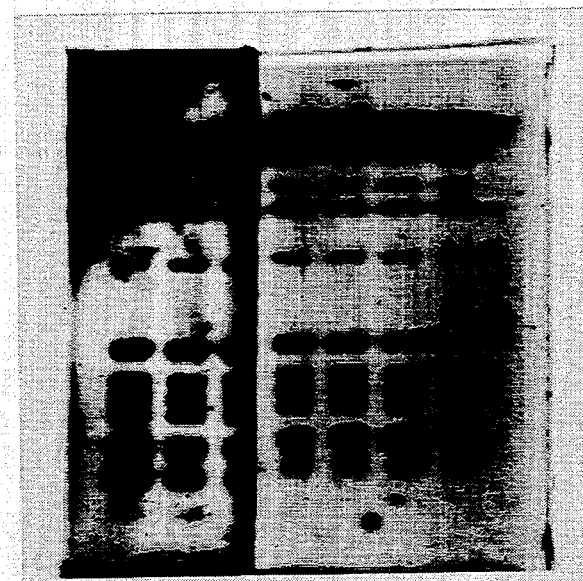

FIG. 8. Gel Staining

Post staining of nucleic acids on an electrophoretic gel using a POPO/BOBO energy transfer mixture, as read by a laser scanner (Example 11 ).

SUMMARY OF THE INVENTION INCLUDING DESCRIPTION OF PREFERRED EMBODIMENTS

The dyes of the invention are symmetrical or asymmetrical dimers containing two unsymmetrical cyanine dye units. At least one cyanine dye unit of the dimer is an unsymmetrical cyanine dye that contains one ring moiety that is formally a pyridinium ring that is conjugated through 1 to 5 methine groups (—CH =) to a second ring moiety that is formally a quaternized benzoxazolium, benzothiazolium, benzimidazolium, 3,3-dialkylindolium, naphthoxazolium, naphthothiazolium, napthimidazolium or benzo-3,3-dialkylindolium; and the other dye unit of the dimer contains a pyridinium or quinolinium ring moiety. Because of the limitations of depicting resonance forms of conjugated molecules, rings that are "formally" pyridinium rings, for instance, which would usually have a positive charge may, in one resonance form, appear to be derivatives of dihydropyridines in the drawings.

The unsymmetrical cyanine dye units are linked by a bridge between the nitrogen atoms of the pyridinium or quinolinium ring moieties of each of the two unsymmetric cyanine dye units. This bridge is neutral or, preferably, incorporates additional positive charges. The two dye units, which may be the same or different, are bridged symmetrically or asymmetrically.

The novel dimers generally have the formula:

α-(CH=CH)$_n$-β-BRIDGE-γ-(CH=CH)$_{n'}$-δ

ψ where each of α and δ is independently a heterocyclic ring moiety that is either a benzazolium ring moiety that is a benzoxazolium, benzothiazolium, benzimidazolium, 3,3-dialkylindolium heterocycle or a naphthazolium ring moiety that is a naphthoxazolium, naphthothiazolium, napthimidazolium or benzo-3,3-dialkylindolium heterocycle. The substituents of the aromatic carbons of the ring moieties α and δ, which are the same or different, are optionally hydrogen, halogen, trifluoromethyl, alkyl, aryl, alkoxy, amino, mono- or dialkylamino, the alkyl portions of which contain 1 to 6 carbons, most preferably 1 carbon. Any nitrogen atom of the heterocyclic ring is each substituted by alkyl with 1 to 6 carbons (preferably 1 to 3 carbons). The 2-positions of the heterocyclic ring moieties link α to β or δ to γ through —(CH=CH)$_n$— and —(CH=CH)$_{n'}$—O respectively, where n and n' are independently 0, 1 or 2. Ψ is a counterion or counterions that neutralize positive charges on the compound. Typical counterions in the final dye include halides such as chloride, bromide or iodide, sulfonate esters such as methanesulfonate, trifluoromethanesulfonate and p-toluenesulfonate or other anions such as perchlorate, tetrafluoroborate or hexafluoroantimonate.

The ring moiety γ is independently a 2-methine-substituted pyridinium moiety:

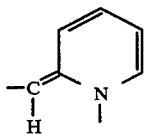

or a 4-methine-substituted pyridinium moiety:

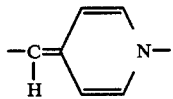

or a 2-methine-substituted quinolinium moiety:

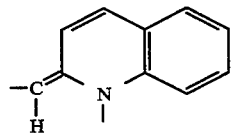

or a 4-methine-substituted quinolinium moiety:

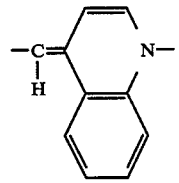

that is linked, through its exocyclic methine residue, to —(CH=CH)$_n$—. The ring moiety β is a 2-methine-substituted pyridinium moiety or a 4-methine-substituted pyridinium moiety that is linked, through its exocyclic methine residue, to —(CH=CH)$_n$—. The remaining substituents of β and γ, which may be the same or different, are optionally hydrogen, halogen, trifluoromethyl, alkyl, alkoxy, amino, mono- or dialkylamino, the alkyl portions of which contain 1 to 6 carbons. Preferably the remaining substituents are all H.

BRIDGE is an aliphatic chain containing a backbone of 4 to 19 methylene groups (—CH$_2$—), which may be interspersed at one or more intervals with heteroatom(s), which may be the same or different, that are N, O or S. Each N heteroatom is additionally substituted by one or two H or alkyl groups with 1 to 6 carbons (preferably H or methyl), which substituents may be the same or different. The heteroatoms are separated from each other by at least 2 methylene groups (preferably 2 to 4 methylene groups). One methylene terminus of BRIDGE is attached to the nitrogen atom of β and the other methylene terminus of BRIDGE is attached to the nitrogen atom of γ. Although each of α and δ also contain a heterocyclic ring nitrogen, attachment of BRIDGE at these nitrogens has been found to result in compounds that do not bind effectively to nucleic acid polymers. Furthermore it is preferred that the substituents on the benzazolium or naphthazolium ring nitrogen are small, with methyl most preferred.

Typically BRIDGE has the formula:

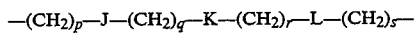

where s is 2–12 (preferably 2 to 6) and p, q and r are independently 0 or 2–6. If any of p, q or r is 0, then the adjacent moiety J, K or L is absent. J, K and L are independently O, S, imino (—NH—), immonium (—NH$_2^+$—), alkylimino (—NR$^1$—), alkylimmonium (—(NHR$^1$)$^+$—) or dialkylimmonium (—(NR$^1$R$^2$)$^+$—), wherein R$^1$ and R$^2$, which are the same or different, independently have 1 to 6 carbons. Typically at least one and more typically at least two of J, K and L is a substituted nitrogen atom or an oxygen atom. Preferably at least two of J, K and L are dialkylimmonium, most preferably dimethylimmonium (—N(CH$_3$)$_2^+$—).

Preferred embodiments of the invention are homodimers of the formula:

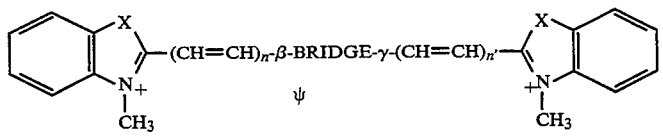

where X is O or S; n=0 or 1; γ is a 4-methine-substituted pyridinium or a 4-methine-substituted quinolinium and β is a 4-methine-substituted pyridinium, where the remaining substituents are hydrogen; and where BRIDGE contains at least two of J, K and L that are C$_1$–C$_2$ dialkylimmonium.

The spectral properties of the novel dimer compounds are similar to, but different from, those of known cyanine dyes, including those in co-pending application Ser. No. 07/833,006 now U.S. Pat. No. 5,321,130 for UNSYMMETRICAL CYANINE DYES WITH CATIONIC SIDE CHAIN described previously. Table 1 contains a comparison of monomer and dimers of unsymmetrical cyanine dyes as well as the widely used nucleic acid stain ethidium homodimer (EthD).

TABLE 1

| COMPARISON OF SPECTRAL CHARACTERISTICS AND BINDING AFFINITIES | | | |
|---|---|---|---|
| Dye | EX max/ EM max (nm)* | ε × 10$^{-3}$ †/ (QY)* | Kp‡ |
| Thiazole orange | 509/525 | 54/(0.2) | 4.8 × 10$^6$ |
| PO-PRO-1 | 435/455 | 50/(0.39) | 2.0 × 10$^6$ |
| BO-PRO-1 | 462/481 | 58/(0.16) | 3.2 × 10$^6$ |
| YO-PRO-1 | 491/509 | 52/(0.44) | 8.2 × 10$^6$ |
| TO-PRO-1 | 515/531 | 62/(0.25) | 2.0 × 10$^7$ |
| BO-PRO-3 | 575/599 | 81/(0.62) | 4.8 × 10$^6$ |
| YO-PRO-3 | 612/631 | 100/(0.16) | 3.3 × 10$^6$ |
| TO-PRO-3 | 642/661 | 102/(0.11) | 6.2 × 10$^6$ |
| POPO-1 | 434/456 | 92/(0.60) | 8.9 × 10$^8$ |
| BOBO-1 | 462/481 | 113/(0.22) | 2.4 × 10$^8$ |
| YOYO-1 | 491/509 | 99/(0.52) | 4.8 × 10$^9$ |
| TOTO-1 | 514/533 | 117/(0.34) | 7.9 × 10$^9$ |
| POPO-3 | 534/570 | 146/(0.46) | 9.1 × 10$^8$ |
| BOBO-3 | 570/602 | 148/(0.39) | 9.6 × 10$^7$ |
| YOYO-3 | 612/631 | 167/(0.15) | 1.5 × 10$^9$ |
| TOTO-3 | 642/660 | 154/(0.06) | 2.0 × 10$^9$ |

TABLE 1-continued

COMPARISON OF SPECTRAL CHARACTERISTICS
AND BINDING AFFINITIES

| Dye | EX max/ EM max (nm)* | $\epsilon \times 10^{-3}$ †/ (QY)* | Kp ‡ |
|---|---|---|---|
| EthD-1 | 528/617 | 7.4/(0.08) | $4.0 \times 10^9$ |

*Quantum yields (QY) and spectral data are of the dye bound to excess calf thymus DNA (50 bp/dye).
† $cm^{-1} M^{-1}$
‡ DNA partition coefficient in a 10% ethanol/water solution As indicated in Table 1, the novel dimers have binding affinities with nucleic acid polymers that are several orders of magnitude greater than known parent compounds; and are comparable to the highly sensitive EthD. The higher binding affinity means that nucleic acids, once stained, stay stained, even if combined with free nucleic acids or subjected to electrophoresis. Thus, for example, nucleic acids can be prestained prior to gel electrophoresis, making the dyes useful for bandshift assays and DNA fingerprinting as well as resulting in considerable savings of dye. Although the homodimers of pyridinium derivatives have been found to have a lesser binding affinity than the corresponding quinolinium derivatives, the pyridinium derivatives unexpectedly bind to nucleic acids much faster that the corresponding quinolinium derivatives (FIG. 5), resulting in shorter waiting times for processing prestained gels. Furthermore, although EthD has a comparable binding affinity, the wide range of novel similar dimer compounds available with different fluorescence properties makes the novel dimers especially advantageous for multicolor applications.

The dimers typically have low or undetectable fluorescence excitation or emission peaks in the unbound state. However, upon binding with DNA or RNA, the optical properties of the dimers change dramatically. In particular, the absorption curve shifts to a longer wavelength, and the dye complexes now exhibit strong fluorescence. Typically the dyes have a Stokes shift of about 20-30 nm. Heterodimers of pyridinium and quinolinium dyes or energy transfer mixtures of dimers can be used to achieve even greater Stokes shifts. Table 2 summarizes the spectral properties of representative dimer compounds as free dye and when bound to DNA. Similar spectra are observed when the dye binds to RNA at concentrations at or less than about 1 dye molecule/5 bases, except that the fluorescence intensity of dyes complexed to single stranded nucleic acids is about ⅓ that of double stranded nucleic acids.

Molar extinction coefficients ($\epsilon_{max}$) for the free dyes were determined by dilution of a DMSO or DMF stock solution with a gravimetrically determined concentration into methanol or 10 mM TRIS, 50 mM NaCl, 1 mM EDTA, pH 7.4 and recording the maximum absorbance on an IBM Instruments 9420 spectrophotometer. Measurements were made in polystyrene cuvettes to counteract surface adsorption of the polycationic dimeric dyes from aqueous solutions. Serial dilutions were used to confirm adherence to the Beer-Lambert law. Extinction coefficients for the DNA-bound dyes were determined by addition of 100 μL of a concentrated calf thymus DNA (Sigma Chemical Co.) stock solution to 2.5 mL of 4 μM dye solution in pH 7.4 TRIS to yield a molar ratio of approximately 50 DNA base pairs per dye (the DNA concentration was calculated from the $A_{260\,nm}$ of the stock solution). The dye-DNA complex was allowed to equilibrate for at least 90 minutes before recording the absorption spectrum. The change in the maximum absorbance relative to the aqueous free dye, after correction for the dilution due to DNA addition was converted to give $\epsilon_{max}$ for the complex.

Fluorescence quantum yields (QY) for the dye-DNA complexes (0.4 μM dye in 10 mM TRIS, 50 mM NaCl, 1 mM EDTA, pH 7.4 with addition of 20 μM (base pairs) calf thymus DNA, equilibrated for 90 minutes) were determined relative to fluorescein in 0.1 M NaOH (QY=0.92, Teale and Weber, Trans. Faraday Soc. 53, 646 (1957)) by integration of corrected fluorescence emission spectra. Appropriately oriented polarizers were used to eliminate the possible effects of non-isotropic fluorescence emission from the DNA complexes.

The subject dimeric dyes form compounds when they bind to DNA or RNA that have considerably enhanced fluorescence emission relative to the dyes that are not compounded with DNA or RNA. Typically this enhancement results in fluorescence of the compound with a nucleic acid that is more than 25-times greater than that of the uncomplexed dye and usually greater than 50-fold, whereas the enhancement of EthD is about 40-fold. In preferred embodiments, this enhancement is greater than 100-fold (FIG. 6). In the most favorable cases this enhancement is greater than about 500-fold.

The fluorescent enhancement that occurs on binding with nucleic acid can also be used to readily distinguish live cells (i.e. cells with intact membranes) from dead (i.e. the integrity of the membrane is disrupted) or permeabilized cells. Dyes that remain outside the cell with intact membranes are relatively non-fluorescent, whereas dyes that gain access to intracellular nucleic acids where the cell membrane is disrupted stain the cells with a bright fluorescence (Example 14). Further-

TABLE 2

SPECTRAL DATA FOR HOMODIMERS

| Compound | Methanol | | pH 7.4 | | pH 7.4 + DNA* | | | |
|---|---|---|---|---|---|---|---|---|
| | $\lambda_A$ | $\epsilon_{max}$ | $\lambda_A$ | $\epsilon_{max}$ | $\lambda_A$ | $\epsilon_{max}$ | $\lambda_F$ | QY |
| POPO-1 | 423 | 136,300 | 409 | 122,700 | 434 | 92,400 | 457 | 0.60 |
| BOBO-1 | 452 | 142,300 | 434 | 130,700 | 462 | 113,600 | 482 | 0.22 |
| YOYO-1 | 481 | 125,800 | 457 | 109,900 | 491 | 98,900 | 509 | 0.52 |
| TOTO-1 | 507 | 131,700 | 480 | 100,700 | 514 | 117,000 | 533 | 0.34 |
| POPO-3 | 531 | 192,700 | 514 | 129,900 | 534 | 146,400 | 572 | 0.46 |
| BOBO-3 | 563 | 164,700 | 533 | 116,300 | 570 | 147,800 | 604 | 0.39 |
| YOYO-3 | 601 | 212,000 | 561 | † | 612 | 167,000 | 631 | 0.15 |
| TOTO-3 | 636 | 211,800 | 581 | † | 642 | 154,100 | 660 | 0.06 |

$\lambda_A$, $\lambda_F$ = absorption and fluorescence maxima (respectively) in nm.
$\epsilon_{max}$ = Molar extinction coefficient in $M^{-1} cm^{-1}$.
QY = Fluorescence quantum yield determined relative to fluorescein in 0.1M NaOH (QY = 0.92).
† = Values not obtainable due to dye aggregation.
*DNA: fluorophore molar ratio of 50 bp:1 or greater in 10 mM Tris, 1 mM EDTA, 50 mM NaCl, pH 7.4.

more, the strong signal differentiation between live and dead cells can be used to sort the live and dead or permeabilized cells, either manually or using an automated procedure such as flow cytometry. The fluorescence intensity of the nucleic acid-dimer complex is proportional to the amount of nucleic acid in the sample (Example 13; FIG. 4), making it possible to use fluorescence to quantitate the nucleic acids. The fluorescence increase from the unsymmetrical cyanine dyes is comparable to or greater than that obtained with other known dimeric dyes such as ethidium homodimer. This significant increase in fluorescence intensity, in addition to the high binding affinity described above, almost eliminates the problem of background fluorescence due to unbound dye and makes it possible to detect even minute amounts of nucleic acids, in most cases without requiring a wash or destaining step. The combination of brightness and high binding affinity also makes it possible to do chromosome sorting, particularly for small chromosomes of organisms such as zebrafish or citrus fruits where conventional labeling techniques are not bright enough to use with flow cytometry to visualize single chromosomes. Furthermore the extinction coefficient for the absorption of these dyes (commonly greater than 100,000 cm$^{-1}$M$^{-1}$) considerably exceeds that of dimers of ethidium-based dyes by more than 10-fold.

The chemical structure of the units that make up the dimers can be varied to achieve a wide range of spectral properties. As is well known for cyanine dyes, [Griffiths, COLOUR AND CONSTITUTION OF ORGANIC MOLECULES, pp. 241 Academic Press (1976)], increasing the length of the polymathinc bridge between the heterocyclic terminal groups (compare e.g. a $-1$ dye with the corresponding $-3$ dye in Table 2) results in a shift of the absorption spectrum to longer wavelengths. Pyridinium derivative dimers in which n and n'=2 have absorption and emission spectra, when bound to nucleic acids, that are beyond 600 nm. The unsymmetrical cyanine dyes containing pyridinium rings (e.g. and POPO) have spectral properties that are shifted to shorter wavelengths than those of the corresponding unsymmetrical cyanine dyes where both units of the dimer contain quinolinium rings (e.g. TOTO and YOYO). Likewise, the benzoxazole derivatives (e.g. POPO and YOYO) tend to have shorter wavelength spectral properties than the corresponding benzothiazole derivatives (e.g, BOBO and TOTO). Dyes having the same value of n or n', but in which $\beta$ is a pyridinium and $\gamma$ is a quinolinium moiety typically have longer wavelength spectra than those where both $\beta$ and $\gamma$ are pyridinium. Likewise dyes in which either or both $\alpha$ or $\delta$ is a naphthazolium moiety (such as naphthothiazolium) rather than a benzazolium moiety (such as benzothiazolium) tend to have longer wavelength spectra. The corresponding heterodimers in which $\alpha$ is benzoxazolium, $\beta$ and $\gamma$ are pyridinium and $\delta$ is benzothiazolium and n and n' are both 0 have spectra intermediate between BOBO and POPO. The dye spectra can also be shifted slightly by introducing further chemical modifications such as (C$_1$-C$_6$) alkyl, alkoxy, alkylamino, dialkylamino, or amino, aryl or halogen substitutions of the aromatic hydrogen atoms (i.e. substituents of the aromatic rings $\alpha$, $\beta$, $\gamma$ or $\delta$).

The range of spectral properties gives a series of related dyes that are useful for applications that involve simultaneous use of multiple dyes. A set of fluorescence emission spectra for a set of 8 different unsymmetrical cyanine dyes bound to nucleic acid polymers, four of which contain pyridinium moieties and four of which are structurally similar except that they contain quinolinium moieties instead of pyridinium moieties is given in FIG. 3. The range of properties also means that the most appropriate dye (or dye mixtures as described below) can be matched to the particular instrument laser being used for an application. It is worth noting, for example, that the argon ion laser, a high power source for fluorescence excitation, has principal output lines at 514 nm and 488 nm, which coincide closely with the excitation maxima of two of the novel quinolinium homodimers. Other dyes (complexed to nucleic acids) are better suited for excitation by the He-Cd (442 nm), green He-Ne (543 nm), Kr (568 and 647 nm), orange He-Ne (594 nm) or red He-Ne (633 nm) laser.

The dyes may also be combined with nucleic acid polymers in mixtures, wherein excitation energy is transferred within the dye/nucleic acid complex, from the dye having the shortest wavelength absorption maximum to the dye that has the longest wavelength emission maximum. The result is a greater yield of long wavelength emission from the combination of dyes than can be obtained from either single dye. For instance, combining the excitation and emission properties of the two dyes results in a nucleic acid/dye complex similar to that formed by the popular nucleic acid stain ethidium bromide but with more than 10-fold greater absorbance, several orders-of-magnitude greater binding affinity and a greater quantum yield when excited in the visible (see FIG. 7).

To utilize the energy transfer combination of dyes, two or more dyes are selected that have the desired match of spectral characteristics, e.g. for mixtures of two dyes, the first dye has excitation maximum in the desired range, the second dye has an emission maximum in the desired range, where the emission spectrum of the first dye overlaps substantially with the excitation spectrum of the second dye. For mixtures containing more dyes, each successive dye would overlap the spectral properties of the preceding and subsequent dyes in the series. Preferably the emission and excitation spectra overlap completely, but energy transfer is possible with less than total spectral overlap, even as little as about 10%. Where the spectral overlap is very low, the energy transfer is less efficient and some emission will be observed at the emission wavelength of dyes other than the last dye in a series.

To utilize the energy transfer mechanism, the dyes are combined with the nucleic acid polymer, either in a mixture or serially, in the ratio that gives the best signal with the least amount of background. Typically the dyes are combined in molar ratios between about 1:10 and about 10:1, more preferably between about 1:5 and about 5:1. Using the characteristics of dyes as described above, a number of hetero and homodimers can be synthesized to yield dyes having overlapping spectra that can then be combined as energy transfer pairs with desired spectral characteristics when combined with nucleic acid polymers. Examples of particularly suitable combinations include YOYO-1 to TOTO-1 or YOYO-1 to POPO-3, POPO-3 to BOBO-3 or YOYO-1 to TOTO-1 to POPO-3.

The synthesis of starting material monomer unsymmetrical cyanine dyes is well documented in the art. In general, when n or n' is 0, a 2-alkylthio-substituted benzoxazolium, benzothiazolium, benzimidazolium, 3,3-dialkylindolium, naphthoxazolium, naphthothiazolium, napthimidazolium or benzo-3,3-dialkylindolium salt is prepared by quaternization of the corresponding 2-alkylthio heterocycle with a $C_1$ to $C_6$ alkyl halide, alkyl sulfonate or similar alkylating agent. Alternatively, reaction of the N-alkyl-2-methylbenzazolium or naphthazolium salt on the 2- or 4-chloropyridinium moiety is used (e.g. Example 7). The original heterocycle may be substituted at positions of aromatic hydrogen atoms by groups such as alkyl, alkoxy, amino, alkylamino, dialkylamino, aryl groups and by halogen atoms. The leaving group from the alkylating agent typically provides the required counterion $\Psi$ for the dye. Alternatively the counterion can be changed by ion exchange using means familiar to one of ordinary skill in the art following synthesis of the dye.

In a separate step, the symmetric quaternized 2-methylpyridinium or 4-methylpyridinium salt is typically prepared from the appropriate dihalide, disulfonate ester or similar bis-alkylating precursor to BRIDGE such as described in Example 9. This salt is condensed with the quaternized 2-alkylthiobenzazolium or 2-alkylthionaphthazolium salt to yield a symmetric dimer of unsymmetric cyanine dyes in which both $\beta$ and $\gamma$ are formally pyridinium moieties such as described in Example 9. Alternatively BRIDGE may be formed subsequent to the condensation step of the pyridinium salt and the 2-alkylthiobenzazolium or 2-alkylthionaphthazolium salt as described in Examples 1 and 3. This latter route is particularly suited to preparation of derivatives in which BRIDGE contains one or more nitrogen heteroatoms. An example of synthesis of a representative dye is given in FIG. 1. n' are both 2 are prepared by a similar sequence except that a $C_1$ to $C_6$ quaternized 2-methylbenzoxazolium, 2-methylbenzothiazolium, 2-methylbenzimidazolium, 2-methyl-3,3-dialkylindolium, 2-methylnaphthoxazolium, 2-methylnaphthothiazolium, 2-methylnapthimidazolium or benzo-2-methyl-3,3-dialkylindolium salt is the initial precursor. The additional ethylene groups are incorporated in either this salt or in the pyridinium or quinolinium salt by reaction with N,N'-diphenylformamidine (HOUBEN-WEYL METHODEN DER ORGANISCHEN CHEMIE, Band V/1d, 1972)(incorporated by reference) to yield an anilinovinyl intermediate (for n or n'=1) or 1-anilino-3-phenylimino-1-propene hydrochloride (U.S. Pat. No. 2,269,234 to Sprague, 1942) to yield a 2-(4-anilinido-1,3-butadienyl) intermediate (for n or n'=2). This intermediate is then condensed with a BRIDGE-quaternized bis-2-methylpyridinium or bis-4-methylpyridinium salt or a BRIDGE-quaternized bis-2-quinolinium or bis-4-quinolinium salt, for instance as described in Example 9. Alternatively BRIDGE can be formed subsequent to formation of the unsymmetric cyanine dye units.

Synthesis of asymmetric dimers of unsymmetric cyanine dyes such as those in which $\beta$ is a pyridinium ring and $\gamma$ is a quinolinium ring, or where $\alpha$ and $\delta$ are different heterocyclic rings or where n≠n' or where the substituents on $\alpha$ and $\delta$ or on $\beta$ and $\gamma$ are not identical, or where BRIDGE is asymmetrically substituted, require careful control of reagent ratios and, in some cases, chromatographic isolation of the correct intermediates using methods familiar in the art. In general, symmetric products are favored, although asymmetric products may have an advantage in certain circumstances in having multiple or broader absorption peaks.

Products are usually purified by a combination of precipitation, recrystallization and, if needed, chromatography such on a column such as Sephadex LH-20 (Pharmacia) or by preparative thin layer chromatography or high performance liquid chromatography. They are typically characterized by their absorption spectra (including extinction coefficient), fluorescence emission spectra when bound to nucleic acids and nuclear magnetic resonance spectra.

The following examples are intended to illustrate methods that can be followed to practice this invention. They are not intended to limit or fully define the scope of invention.

EXAMPLE 1: PREPARATION OF A REPRESENTATIVE SYMMETRIC DIMER OF A BENZOTHIAZOLIUM DERIVATIVE CONTAINING TWO PYRIDINIUM MOIETIES
(Compound 1/BOBO-1)

The following compound is prepared:

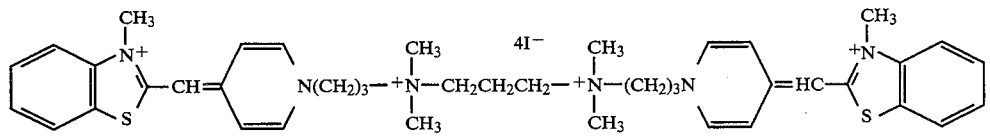

In the first step, 2-methylthiobenzothiazole (Aldrich Chemical Company, Milwaukee, Wis.) is quaternized by heating at 120° C. with an equivalent of methyl p-toluenesulfonate to yield N-methyl-2-methylthiobenzothiazolium p-toluenesulfonate (Compound 1A is also commercially available from TCI, Portland, Oreg.). N-(3-iodopropyl)-4-methylpyridinium iodide (Compound 1 B) is prepared by heating 4-methylpyridine (1.00 g) with 5 mL of 1,3-diiodopropane without a solvent at 120° C. for about 1 hour. Ethyl acetate is added and the product is filtered. Compounds 1A and 1B are condensed to yield 1'-(3'-iodopropyl)-3-methyl-4'-thiacyanine iodide (Compound 1C) using methods known in the art [e.g. Brooker, et al. J. AM. CHEM. SOC. 64, 199 (1942)]. For instance when 2.93 g of 1A is stirred with 3.3 g of 1 B with the addition of 1.15 mL of triethylamine in 20 mL of $CH_2Cl_2$ for 16 hours at room temperature followed by the addition of 80 mL of ethyl acetate about 1.1 g of 1 C is obtained.

To prepare Compound 1,680 mg of Compound 1C (1.27 mmoles) is heated with 83 mg of N,N,N',N'-tetramethyl-1,3-propanediamine (0.64 mmoles) in 10 mL of dimethylformamide (DMF) at 100° C. for two days. After the reaction mixture cools down to room temperature, 10 mL of MeOH is added and the solution is stored at −20° C. overnight. The yellow-brown colored solid is filtered and recrystallized twice from DMF/MeOH to yield about 170 mg of pure Compound 1.

EXAMPLE 2: PREPARATION OF A REPRESENTATIVE SYMMETRIC DIMER OF A BENZOTHIAZOLIUM DERIVATIVE CONTAINING TWO QUINOLINIUM MOIETIES (Compound 2/TOTO-1)

The following compound is prepared:

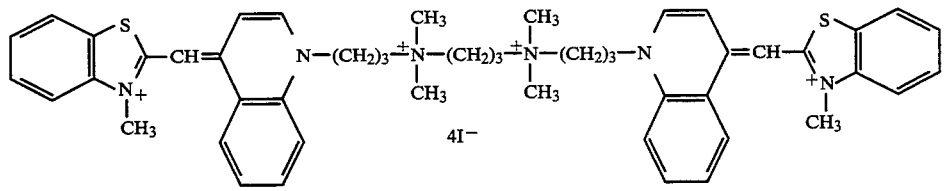

As in Example 1, a mixture of 0.72 g of a 1'-(3'-iodopropyl)-3-methyl-4'-thiacyanine iodide precursor (prepared according to methods known in the art e.g. Brooker, et al. J. AM. CHEM. SOC. 64, 199 (1942)), and 69 mg of N,N,N'N'-tetramethylpropanediamine in 5 mL of DMF is heated at 130° C.; for one hour. After the reaction mixture cools down to room temperature, 40 mL of MeOH is added and stored at −20° C. overnight. The red solid is filtered and recrystallized from DMF/MeOH again to yield the pure product Compound 2.

EXAMPLE 3: PREPARATION OF A REPRESENTATIVE SYMMETRIC DIMER OF A BENZOXAZOLIUM DERIVATIVE CONTAINING TWO PYRIDINIUM RINGS (Compound 3/POPO-1)

The following compound is prepared:

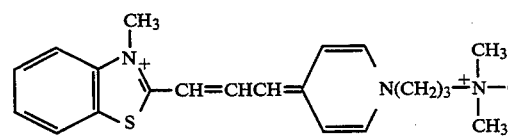

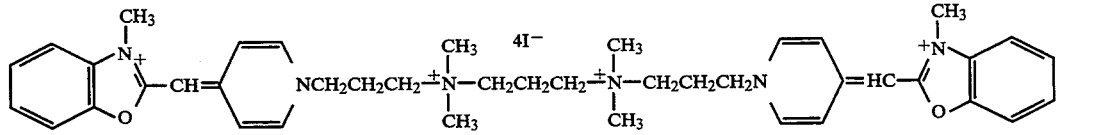

Compound 3 is prepared analogously to Compound 1 except that the starting material is N-methyl-2-methylthio-benzoxazolium p-toluenesulfonate, which is prepared by first methylating the commercially available 2-mercaptobenzoxazole (Aldrich Chemical Co.) with potassium carbonate and methyl iodide and the 2-methylthiobenzoxazole is then quaternized by heating with an equivalent of methyl tosylate at 150° C. for one hour. The appropriate benzoxazole derivative dimer precursors are prepared according to Brooker, et al. J. AM. CHEM. SOC. 64, 199 (1942).

EXAMPLE 4: PREPARATION OF A REPRESENTATIVE SYMMETRIC DIMER OF A BENZOXAZOLIUM DERIVATIVE CONTAINING TWO QUINOLINIUM MOIETIES (Compound 4/YOYO-1)

The following compound is prepared:

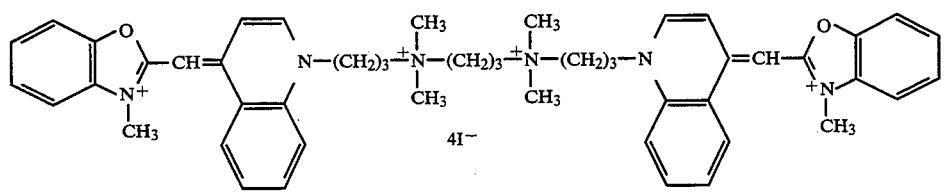

The appropriate benzoxazole derivative dimer precursors are prepared according to Brooker, et al. J. AM. CHEM. SOC. 64, 199 (1942) and are dimerized according to the procedure of Example 1.

EXAMPLE 5: PREPARATION OF A REPRESENTATIVE SYMMETRIC DIMER WITH TWO PYRIDINIUM RINGS HAVING INCREASED ABSORPTION WAVELENGTH (Compound 5/BOBO-3)

The following compound is prepared:

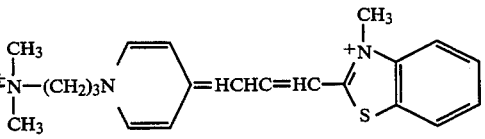

The monomeric precursor to rings α and δ of Compound 5 is prepared from 2-(2-anilidovinyl)-3-methylbenzothiazolium tosylate (Compound 5A), which is prepared from N,2-dimethylbenzothiazolium p-toluenesulfonate and N,N-diphenylformamidine (HOUBEN-WEYL METHODEN DER ORGANISCHEN CHEMIE, Band V/1d, 1972). Compound 5A (2.64 g) is stirred with Compound 1B (2.6 g) in the presence of 0.6 g of acetic anhydride and 1.45 mL of triethylamine in 50 mL of $CH_2Cl_2$ at room temperature for 16 hours. One hundred mL of ethyl acetate is added to induce precipitation. The crude sticky precipitate is refluxed in 50 mL of MeOH for 30 minutes. After refrigeration for several hours, the solution is filtered to obtain the product. The filtrate is reduced to about 20 mL of methanol to yield some additional amount. The total yield is about 1 g.

Compound 5B (280 mg, 0.5 mmoles) is heated in DMF at 100° C. for two days with 32 mg of N,N,N',N'-tetramethyl-1,3-propanediamine (0.25 mmoles). Product isolation and purification as in Example 1 yields approximately 36 mg of a purple-colored solid.

The corresponding benzoxazolium derivative (POPO-3) is similarly prepared using the appropriate benzoxazolium precursors.

EXAMPLE 6: PREPARATION OF A REPRESENTATIVE SYMMETRIC DIMER WITH TWO QUINOLINIUM RINGS HAVING INCREASED ABSORPTION WAVELENGTH (Compound 6/TOTO-3)

The following compound is prepared:

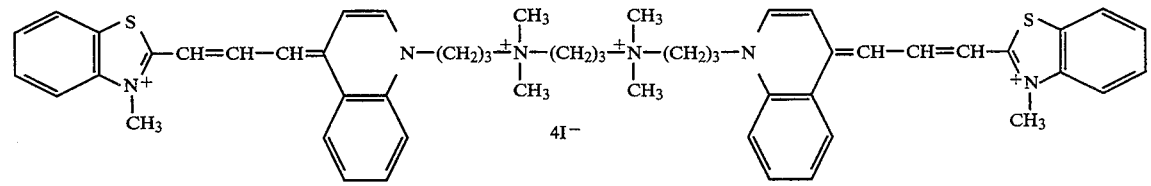

The monomer precursor is prepared from 2-(2-anilidovinyl)-3-methylbenzothiazolium tosylate according to Brooker, et al. J. AM. CHEM. SOC. 64, 199 (1942) and is dimerized according to the procedure of Example 5.

The corresponding benzoxazolium derivative (YOYO-3) is similarly prepared using the appropriate benzoxazolium precursors.

EXAMPLE 7: PREPARATION OF A REPRESENTATIVE SYMMETRIC DIMER OF A NAPTHOTHIAZOLIUM DERIVATIVE (Compound 7)

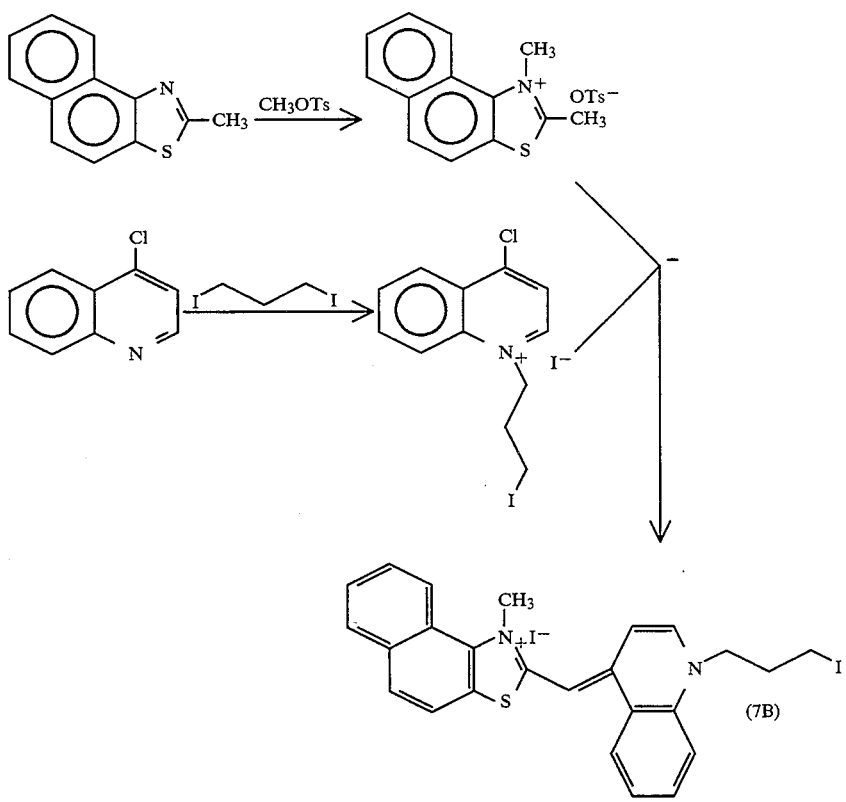

The starting 2,3-dimethyl-β-naphthothiazolium tosylate (Compound 7A) is prepared by heating equal moles of the 2-methyl-β-naphthothiazole (Aldrich Chemical Co.) and methyl tosylate at 160° C. for an hour. The tosylate (Compound 7A, 0.385 g, 1 mmoles) is then stirred in 10 mL of methylene chloride at room temperature with 0.41 g (1 mmoles) of 1-(3-iodopropyl)-4-chloropyridinium iodide (from 4-chloropyridine and 1,3-diiodopropane) while 0.14 mL (1 mmoles) of triethylamine is introduced. The reaction mixture is stirred at room temperature overnight and the desired monomer (Compound 7B) is isolated as its iodide salt by filtration.

7B is then dimerized according to Example 1 to yield Compound 7.

EXAMPLE 8: PREPARATION OF A REPRESENTATIVE DIMER CONNECTED AT THE 2 POSITION OF THE PYRIDINE INSTEAD OF THE 4 POSITION (Compound 8)

The following compound, which is an isomer of Compound 1/BOBO-1 is prepared:

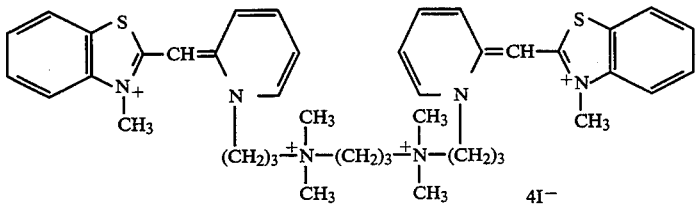

Compound 8 is prepared analogously to Compound 1 in Example 1, except that one reactant is N-(3-iodopropyl)-2-methylpyridinium iodide (Compound 8A), which is prepared by reaction of 2-methylpyridine and 1,3-diiodopropane.

EXAMPLE 9: PREPARATION OF A REPRESENTATIVE SYMMETRIC DIMER WITH TWO PYRIDINIUM RINGS AND AN UNSUBSTITUTED ALKYL BRIDGING GROUP (Compound 9)

The following compound is prepared:

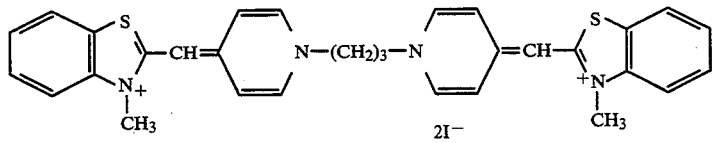

Compound 9 is prepared from bis-(4-methylpyridinium)-1,3-propane dibromide (Compound 5A) and 2.2 equivalents of N-methyl-2-methylthiobenzothiazolium p-toluenesulfonate (Compound 1 A) according to the method of Example 1 and Brooker, et el., J. AM. CHEM. SOC. 64, 199 (1942). The orange-colored product is recrystallized from methanol/ether to yield Compound 9. The dibromide 9A is obtained by refluxing 6 g of 4-methylpyridine with 3 g of 1,3-dibromopropane in 4 mL of DMF for 6 hours. The solution is cooled to room temperature and 150 mL of ether is added to precipitate the crude product, which is used without further purification.

EXAMPLE 10: PREPARATION OF AN UNSYMMETRICAL DIMER WITH ONE PYRIDINIUM MOIETY AND ONE QUINOLINIUM MOIETY (Compound 10)

The following compound is prepared:

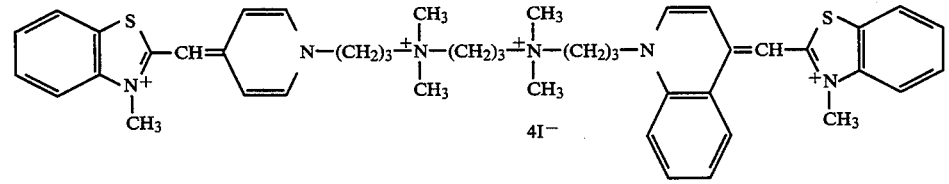

N-(3-Iodopropyl)-4-methylpyridinium iodide (Compound 1B) (450 mg) is heated with 5 mL N,N,N',N'-tetramethyl-1,3-propanediamine (3.0 mmoles) in 10 mL of DMF at 130° C. for one hour. The solution is cooled, the product is precipitated with ether and the brown solid is collected by filtration. The quaternized product, which is N-(3-dimethylamino)propyl)-N,N-dimethyl-N-(3-(4-methyl-1-pyridinium)propyl)ammonium diiodide (Compound 10A), is recrystallized from methanol-/acetone until free of the symmetric dimer then heated for 4 hours with N-(3-iodopropyl)-4-methylquinolinium iodide (Compound 10B) at 130° C. in DMF to yield the asymmetric tetracationic Compound 10C, which is purified by recrystallization from methanol. Compound 10C is reacted with 2.2 equivalents of N-methyl-2-methylthiobenzothiazolium p-toluenesulfonate (Compound 1A) as in Example 1 to yield the asymmetric dimer Compound 10 in which, according to the general formula, $\beta$ is a pyridinium moiety and $\gamma$ is a quinolinium moiety.

EXAMPLE 11: STAINING OF NUCLEIC ACIDS IN ELECTROPHORETIC GELS WITH AN ENERGY TRANSFER MIXTURE OF TWO DIMERS OF DIFFERENT WAVELENGTHS

Samples containing 200 ng of a 1 kb ladder of marker DNA (Gibco/BRL, Life Technologies, Inc.) are electrophoresed on a 0.8% agarose gel in TBE (89 mM Tris-borate, 89 mM boric acid, 2 mM EDTA, pH 8.0). The gel is cut in two parts. One part is stained with 5 $\mu$g/mL ethidium bromide and the other stained with a 1:1 mixture of 20 $\mu$M BOBO-3 and 20 $\mu$M POPO-3. The equimolar mixture of BOBO-3 and POPO-3 can be excited at 530 nm (near the excitation maximum of POPO-3) to give an emission maximum (near the emission maximum of BOBO-3) at about 609 nm (see FIG. 6). The poststained agarose gel is visualized on a laser scanner (FMBIO, Hitachi Software Engineering America, Ltd., San Bruno, Calif.). Staining with BOBO-3/POPO-3 (the left side of FIG. 8) is clearly more sensitive, as evidenced by the intensity of the signal for the lower molecular weight fragments.

EXAMPLE 12: USE OF DIMERS AS A COUNTERSTAIN FOR CHROMOSOME SPREADS

Chromosome spreads are prepared using standard procedures (see for example "Nucleic Acid Hybridization: a practical approach," B. D. Hames and S. J. Higgens, editors, IRL Press, Washington, D.C., 1985, incorporated by reference). In situ hybridization and secondary staining for detection of hybrids is done using standard procedures as well (ibid). A dimer counterstain is selected having the appropriate spectrum. Just enough dye to cover the sample is added to the slide as a 1 μM solution in TBS (89 mM Tris-borate, 89 mM boric acid, 2 mM EDTA, pH 8.0) or water. The slide is incubated for 1 minute, at room temperature. The slide is rinsed three times with phosphate buffered saline (PBS) (8 g NaCl, 0.2 g KCl, 1.44 g $Na_2HPO_4$, 0.24 g $KH_2PO_4$, pH 7.4 per liter). The sample is air dried and detected using the appropriate optical filters on a standard fluorescence microscope.

EXAMPLE 13: FLUOROMETRIC QUANTITATION OF DNA USING DIMERS

Dimer dyes are diluted into T.E. (10 mM Tris-Cl, 1 mM EDTA) to a final concentration of 1 μM in plastic cuvettes or micro centrifuge tubes. The DNA sample is added to the dye and mixed rapidly. The sample is incubated for about 5 minutes at room temperature for pyridinium dyes and for at least 45 minutes for the quinolinium dyes. The fluorescence is measured using a fluorometer. A standard curve is prepared using known amounts of DNA and fluorescence of unknown samples is compared to the curve for quantitation. Samples containing as little as about 100–200 ng of DNA/mL are reproducibly measurable using this technique (FIG. 4). Reducing the volume by using capillaries or using a higher power excitation source such as a laser or more sensitive detection such as a cooled CCD camera permits detection of even lower amounts of nucleic acids.

EXAMPLE 14: QUANTITATIVE FLUORIMETRIC DETERMINATION OF DEAD CELLS

Cells from the cell line P3x63Ag8.653 (IgG, non-secreting mouse myeloma) from a BALB/c mouse are propagated for 3–4 days in Dulbecco's modified Eagle's medium with 10% calf serum, 1% HEPES Buffer solution, 1% L-glutamine, and 0.5% gentamicin. The cells are washed twice in phosphate buffered saline (PBS), centrifuged at 700 rpm for 10 minutes, and resuspended in PBS. The cells are counted by trypan blue exclusion using a hemocytometer. Viability is determined and cell concentration is adjusted to $1.2 \times 10^6$ cells/mL.

The cells are divided into two populations; one population is killed by heating to 60° C. for 15 minutes. The cell concentration is readjusted to 600,000 cells/mL. A known number of cells is eliquoted into a 96-well microtiter plate, and PBS added to wells so that the volume in each sample well is 200 μL, followed by the addition of 100 μL of 6 μM of the dimeric dye to each sample well so that the final concentration of dye is 2 μM. The fluorescence versus cell number is read on a fluorescence microtiter plate reader (Millipore Cytofluor 2300) using a suitable combination of excitation and emission filters. For compounds 2 and 4 excitation at 485 nm and emission detection at 530 nm is suitable. The linear proportionality of fluorescence signal to number of dead cells is used to quantitatively assess cell viability.

EXAMPLE 15: STAINING PREPARATIONS OF FIXED CELLS WITH AN EXAMPLE OF THE DIMERIC UNSYMMETRICAL CYANINE DYES CONTAINING PYRIDINIUM MOIETIES.

Cells are grown according to standard procedures. Cells are then fixed by incubation with 0.1% glutaraldehyde in 2×SSC (17.5 g NaCl, 8.8 g sodium citrate, pH 7.0 per liter) for 5–10 minutes at room temperature. They are then permeabilized by incubation with ice cold acetone for 5–10 minutes on ice and labeled with 5 μM BOBO-1 or POPO-1 in water. This results in bright nuclear staining and weak (if any) cytoplasmic staining.

To visualize RNA in the cytoplasm rather than DNA in the nucleus, cells are fixed with paraformaldehyde followed by Triton or methanol/acetic acid permeabilization using standard procedures. These procedures result in bright cytoplasmic staining and weak nuclear staining.

EXAMPLE 16: DETERMINING THE RELATIVE AFFINITY OF THE DIMERIC DYES VERSUS THE MONOMERIC DYES AND OTHER DIMERIC DYES.

Incremental amounts of calf thymus DNA (0.1 μM–10 μM for monomers and 5 nM–100 nM for dimers) in a binding buffer (10 mM phosphate pH 7.0 with 1 mM EDTA, 100 mM NaCl, and 10% ethanol) are added to 0.1 μM solutions of monomer compounds or 5.0 nM solutions of dimer compounds, keeping concentrations of dye constant. The fluorescence intensity (F) determined in a fluorometer is measured versus DNA concentration expressed in terms of base pairs (B). In all the titrations, [Dye]/[Base Pair] is always larger than 3.

The nucleic acid/water partition coefficient ($K_p$) representing the relative affinity of the dye for DNA is calculated from the fluorescence data according to the following formula:

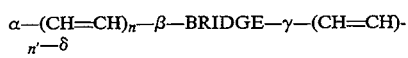

$$1/F = [5.6 \cdot 10^7/(K_p F_0)](1/B) + 1/F_0$$

where $5.6 \cdot 10^7$ (μM) is the molar concentration of water; and $F_0$ is the fluorescence enhancement at saturation. Table 1 gives the $K_p$ values of representative dyes via the partition model in the presence of 10% ethanol.

It is to be understood that, while the foregoing invention has been described in detail by way of illustration and example, numerous modifications, substitutions, and alterations are possible without departing from the spirit and scope of the invention as described in the following claims.

What is claimed is:

1. A compound of the formula:

$$\alpha\text{—}(CH{=}CH)_n\text{—}\beta\text{—}BRIDGE\text{—}\gamma\text{—}(CH{=}CH)_{n'}\text{—}\delta$$

where each of α and δ is independently a benzazolium ring moiety that is a benzoxazolium, benzothiazolium, benzimidazolium, 3,3-dialkylindolium heterocycle or a naphthazolium ring moiety that is a naphthoxazolium, naphthothiazolium, napthimidazolium or benzo-3,3-dialkylindolium heterocycle, each of the nitrogen atoms of which is substituted by alkyl with 1 to 6 carbons, which benzazolium ring moiety is linked to —(CH=CH)$_n$— or —(CH=CH)$_{n'}$— respectively through a 2-position of the ring moiety, wherein the remaining substituents of the ring moiety are independently hydrogen, halogen, trifluoromethyl, alkyl, alkoxy, amino, mono- or dialkylamino, the alkyl portions of which contain 1 to 6 carbons;

n and n' are independently 0, 1 or 2;

β is a first 2-methine-substituted pyridinium:

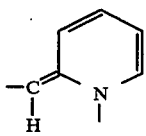

or a first 4-methine-substituted pyridinium:

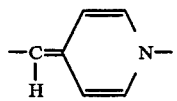

that is linked to —(CH=CH)$_n$— through an exocyclic methine residue of β, which pyridinium is optionally substituted by hydrogen, halogen, trifluoromethyl, alkyl, alkoxy, amino, mono- or dialkylamino, the alkyl portions of which contain 1 to 6 carbons;

BRIDGE is an aliphatic chain containing a backbone of 4 to 19 methylene groups (—CH$_2$—), which is optionally interspersed at one or more intervals with a heteroatom, each of which is independently N, O or S, wherein each N heteroatom is additionally substituted by H, alkyl or two alkyl groups with 1 to 6 carbons, which alkyl substituents may be the same or different, provided that any heteroatom is separated from another heteroatom by at least 2 methylene groups, wherein one methylene terminus of BRIDGE is attached to a nitrogen atom of β and another methylene terminus of BRIDGE is attached to a nitrogen atom of γ;

γ is a second 2-methine-substituted pyridinium or a second 4-methine-substituted pyridinium or a 2-methine-substituted quinolinium:

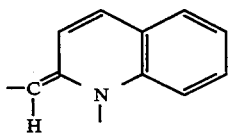

or a 4-methine-substituted quinolinium:

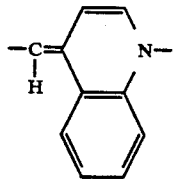

that is linked to —(CH=CH)$_{n'}$— through an exocyclic methine residue of γ, which pyridinium or quinolinium is optionally substituted by hydrogen, halogen, trifluoromethyl, alkyl, alkoxy, amino, mono- or dialkylamino, the alkyl portions of which contain 1 to 6 carbons;

and Ψ is a counterion or counterions that neutralize positive charges on the compound.

2. A compound, as claimed in claim 1, where α and δ are each benzothiazolium or benzoxazolium moieties.

3. A compound, as claimed in claim 2, where β and γ are each pyridinium moieties.

4. A compound, as claimed in claim 2, in which n and n' are both 0.

5. A compound, as claimed in claim 2, in which n and n' are both 1.

6. A compound, as claimed in claim 1, where β and γ are each pyridinium moieties.

7. A compound, as claimed in claim 6, where α and δ are each benzoxazolium moieties.

8. A compound, as claimed in claim 6, where α and δ are each benzothiazolium moieties.

9. A compound, as claimed in claim 1, where BRIDGE has the formula:

—(CH$_2$)$_p$—J—(CH$_2$)$_q$—K—(CH$_2$)$_r$—L—(CH$_2$)$_s$— where s is 2–12 and p, q and r are independently 0 or 2–6, provided that if any of p, q or r is 0 then the adjacent moiety J, K or L is absent;

and wherein J, K and L are independently O, S, imino (—NH—), immonium (—NH$_2$+—), alkylimino (—NR$^1$—), alkylimmonium (—NHR$_1$+—) or dialkylimmonium (—NR$^1$R$^2$+—), wherein R$^1$ and R$^2$ independently have 1 to 6 carbons.

10. A compound, as claimed in claim 9, where α and δ are each benzothiazolium or benzoxazolium moieties.

11. A compound, as claimed in claim 10, where β and γ are each pyridinium moieties.

12. A compound, as claimed in claim 11, in which n and n' are both 0.

13. A compound, as claimed in claim 11, in which n and n' are both 1.

14. A compound, as claimed in claim 9, where β and γ are each pyridinium moieties.

15. A compound, as claimed in claim 14, where α and δ are each benzoxazolium moieties.

16. A compound, as claimed in claim 14, where α and δ are each benzothiazolium moieties.

17. A compound, as claimed in claim 9, where at least one of J, K and L is imino (—NH—), immonium (—NH$_2$+—), alkylimino (—NR$^1$—), alkylimmonium (—NHR$_1$+—) or dialkylimmonium (—NR$^1$R$^2$+—).

18. A compound, as claimed in claim 9, where at least two of J, K and L are dimethylammonium.

19. A compound of the formula:

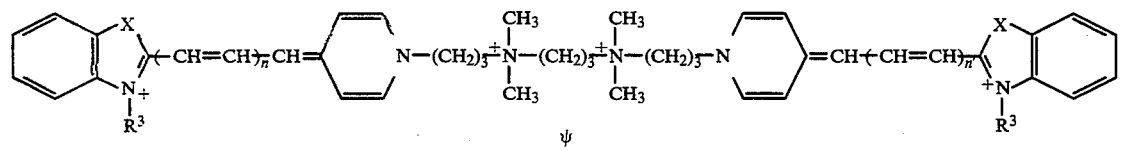

where X is S or O;
R$^3$ is C$_1$ to C$_6$ alkyl;
Ψ is a counterion or counterions that neutralize positive charges on the compound;

and wherein n and n' are independently 0, 1 or 2.

20. A compound, as claimed in claim 19, wherein X is S or O, $R^3$ is methyl and n and n' are both 0.

21. A compound, as claimed in claim 19, wherein X is S or O, $R^3$ is methyl and n and n' are both 1.

22. A compound comprising a nucleic acid polymer bound to one or more dye molecules of the formula:

where each of α and δ is independently a benzazolium ring moiety that is a benzoxazolium, benzothiazolium, benzimidazolium, 3,3-dialkylindolium heterocycle or a naphthazolium ring moiety that is a naphthoxazolium, naphthothiazolium, napthimidazolium or benzo-3,3-dialkylindolium heterocycle, each of the nitrogen atoms of which is substituted by alkyl with 1 to 6 carbons, which benzazolium ring moiety is linked to —(CH=CH-)$_n$— or —(CH=CH)$_{n'}$— respectively through a 2-position of the ring moiety, wherein the remaining substituents of the ring moiety are independently hydrogen, halogen, trifluoromethyl; alkyl, alkoxy, amino, mono- or dialkylamino, the alkyl portions of which contain 1 to 6 carbons;

n and n' are independently 0, 1 or 2;

β is a first 2-methine-substituted pyridinium:

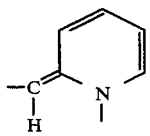

or a first 4-methine-substituted pyridinium:

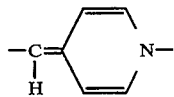

that is linked to —(CH=CH)$_n$— through an exocyclic methine residue of β, which pyridinium is optionally substituted by hydrogen, halogen, trifluoromethyl, alkyl, alkoxy, amino, mono- or dialkylamino, the alkyl portions of which contain 1 to 6 carbons;

BRIDGE is an aliphatic chain containing a backbone of 4 to 19 methylene groups (—CH$_2$—), which is optionally interspersed at one or more intervals with a heteroatom, each of which is independently N, O or S, wherein each N heteroatom is additionally substituted by H, alkyl or two alkyl groups with 1 to 6 carbons, which alkyl substituents may be the same or different, provided that any heteroatom is separated from another heteroatom by at least 2 methylene groups, wherein one methylene terminus of BRIDGE is attached to a nitrogen atom of β and another methylene terminus of BRIDGE is attached to a nitrogen atom of γ;

γ is a second 2-methine-substituted pyridinium or a second 4-methine-substituted pyridinium or a 2-methine-substituted quinolinium:

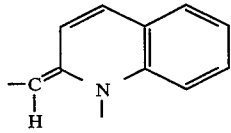

or a 4-methine-substituted quinolinium:

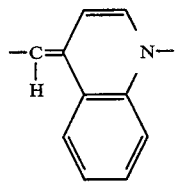

that is linked to —(CH=CH)$_{n'}$— through an exocyclic methine residue of γ, which pyridinium or quinolinium is optionally substituted by hydrogen, halogen, trifluoromethyl, alkyl, alkoxy, amino, mono- or dialkylamino, the alkyl portions of which contain 1 to 6 carbons;

and Ψ is a counterion or counterions that neutralize positive charges on the compound such that the fluorescence of said dye molecules when bound to the nucleic acid polymer is enhanced.

23. A compound, as claimed in claim 22, wherein BRIDGE has the formula:

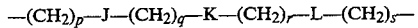

where s is 2–12, and p, q and r are independently 0 or 2–6, provided that if any of p, q or r is 0 then the adjacent moiety J, K or L is absent;

and wherein J, K and L are independently O, S, imino (—NH—), immonium (—NH$_2^+$—), alkylimino (—NR$^1$—), alkylimmonium (—NHR$_1^+$—) or dialkylimmonium (—NR$^1$R$^{2+}$—), wherein R$^1$ and R$^2$ independently have 1 to 6 carbons.

24. A compound, as claimed in claim 22, wherein the dye has the formula:

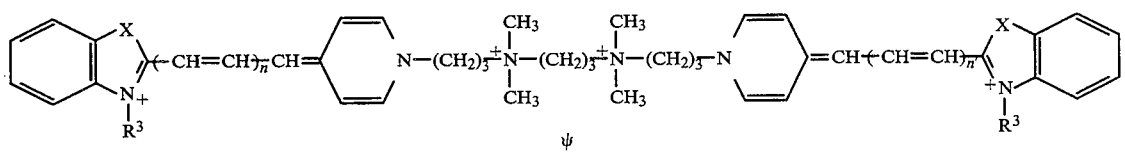

or

-continued

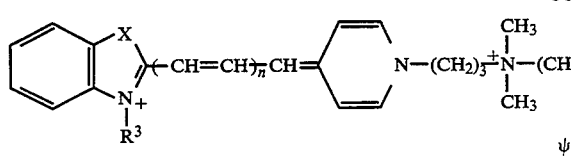 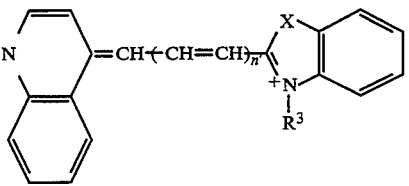

where X is S or O;
R³ is C₁ to C₆ alkyl;
and wherein n and n' are independently 0, 1 or 2.

25. A compound, as claimed in claim 22, where the nucleic acid polymer is DNA.

26. A compound, as claimed in claim 22, where the nucleic acid polymer is RNA.

27. A compound, as claimed in claim 22, where the nucleic acid polymer is intracellular.

28. A compound, as claimed in claim 22, where the fluorescence enhancement of the dye molecules when bound to the nucleic acid is greater than about 50-fold.

29. A compound, as claimed in claim 22, containing at least two different dye molecules having different spectral properties, where a first dye molecule has an emission maximum that substantially overlaps an excitation maximum of a second dye molecule.

30. A compound, as claimed in claim 29, where one of the different dye molecules are selected from the group consisting of:

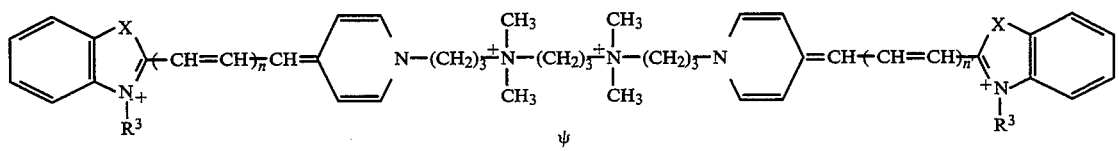

and

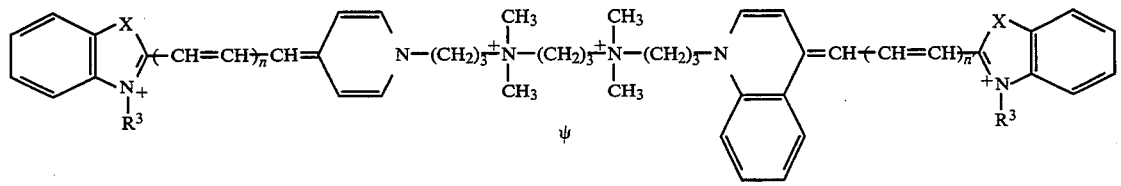

where X is S or O;
R³ is C₁ to C₆ alkyl;
and wherein n and n' are independently 0, 1 or 2.

* * * * *

UNITED STATES PATENT AND TRADEMARK OFFICE
CERTIFICATE OF CORRECTION

PATENT NO. : 5,410,030
DATED : April 25, 1995
INVENTOR(S) : Yue, et al.

It is certified that error appears in the above-indentified patent and that said Letters Patent is hereby corrected as shown below:

At col 4, line 58, "—(CH=CH)$_n$,—0" should be ——(CH=CH)$_{n'}$—--.

At col 5, line 44, "—(CH=CH)$_n$,—." should be ——(CH=CH)$_{n'}$—.--.

At col 9, line 41, "(e.g. and POPO)" should be --(e.g. BOBO and POPO)--.

Figure 1:
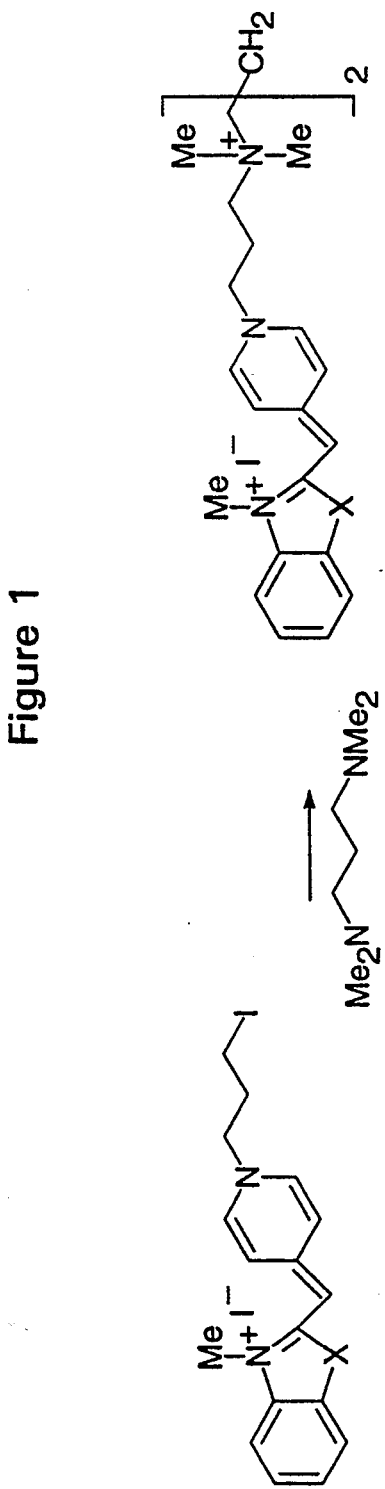
FIG. 1 Synthesis Pathway of a Representative Dimer from Intermediates

At col 11, line 39, "FIG 1. n'" should be --FIG 1. Symmetric dimers of unsymmetric cyanine dyes where n and n' are both 1 or n and n'--.

At col 12, line 59, "1,680" should be --1, 680--.

Signed and Sealed this

Third Day of September, 1996

Attest:

BRUCE LEHMAN

*Attesting Officer*    Commissioner of Patents and Trademarks